(No Model.) 6 Sheets—Sheet 1.

W. H. ROBINETT.
HYDRAULIC MOTOR.

No. 476,174. Patented May 31, 1892.

Witnesses:
F. G. Fischer
S. L. C. Hasson

Inventor
William H. Robinett
By Rich. H. Manning Atty.

(No Model.)

W. H. ROBINETT.
HYDRAULIC MOTOR.

No. 476,174.  Patented May 31, 1892.

6 Sheets—Sheet 2.

Witnesses:
F. G. Fischer
S. L. C. Hasson

Inventor:
William H. Robinett
By Rich. H. Manning Atty.

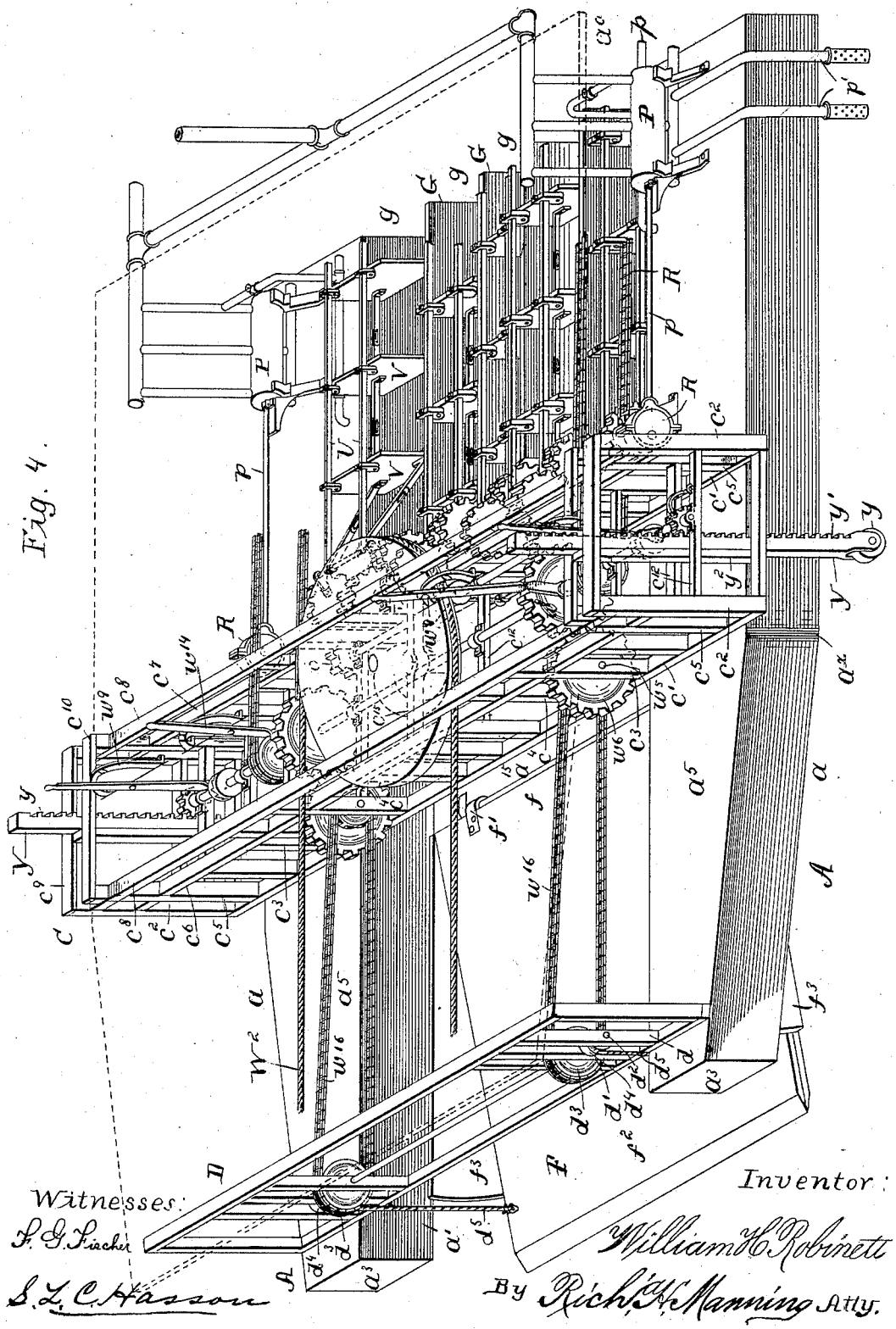

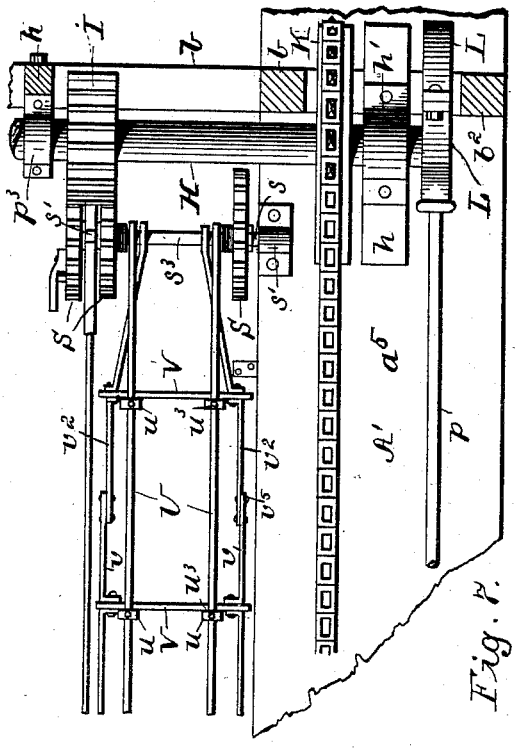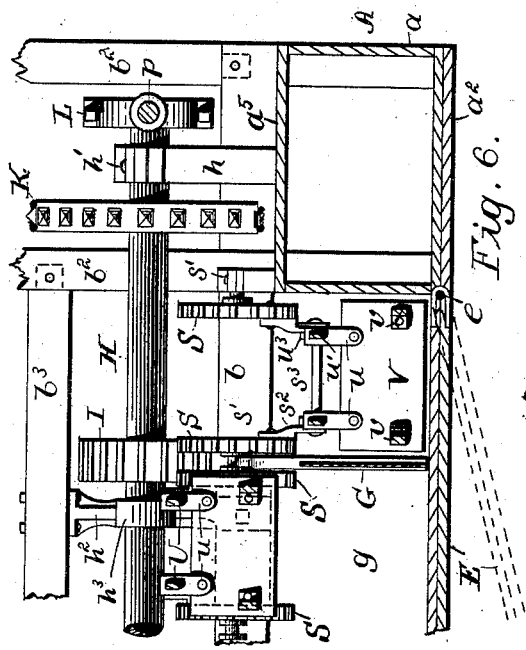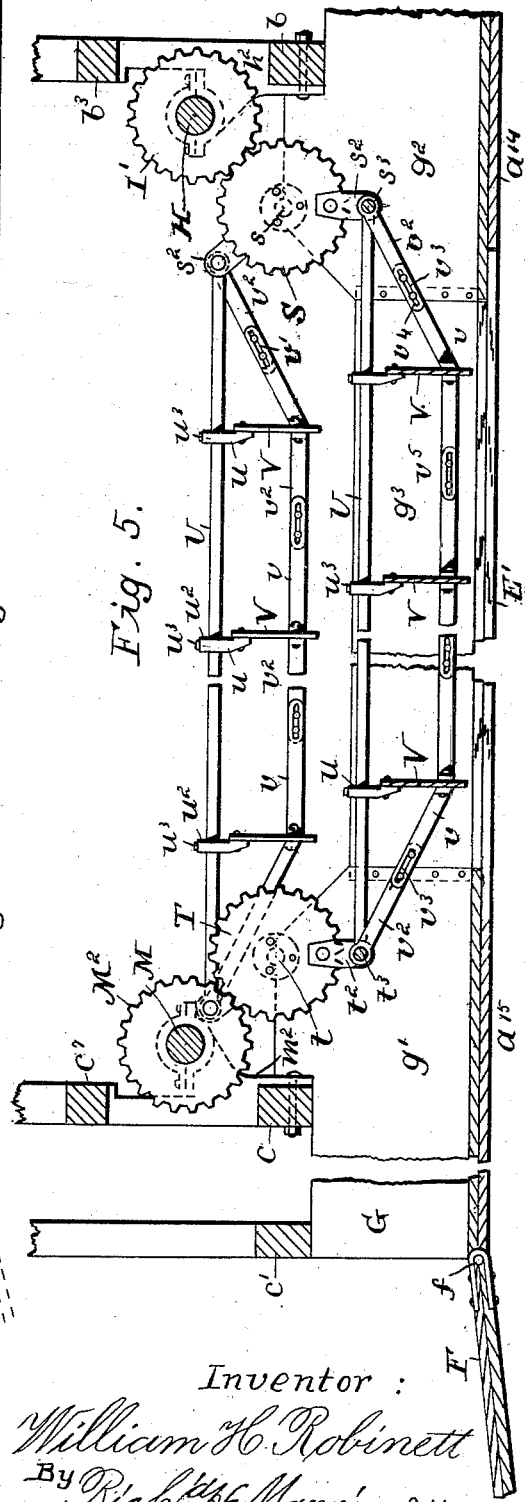

(No Model.) 6 Sheets—Sheet 5.
W. H. ROBINETT.
HYDRAULIC MOTOR.
No. 476,174. Patented May 31, 1892.
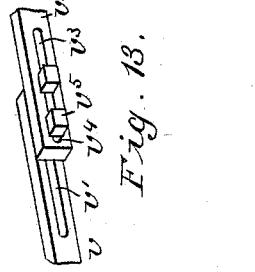
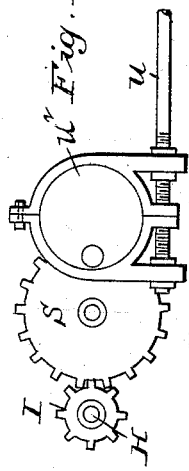
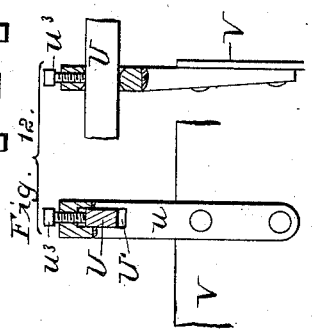
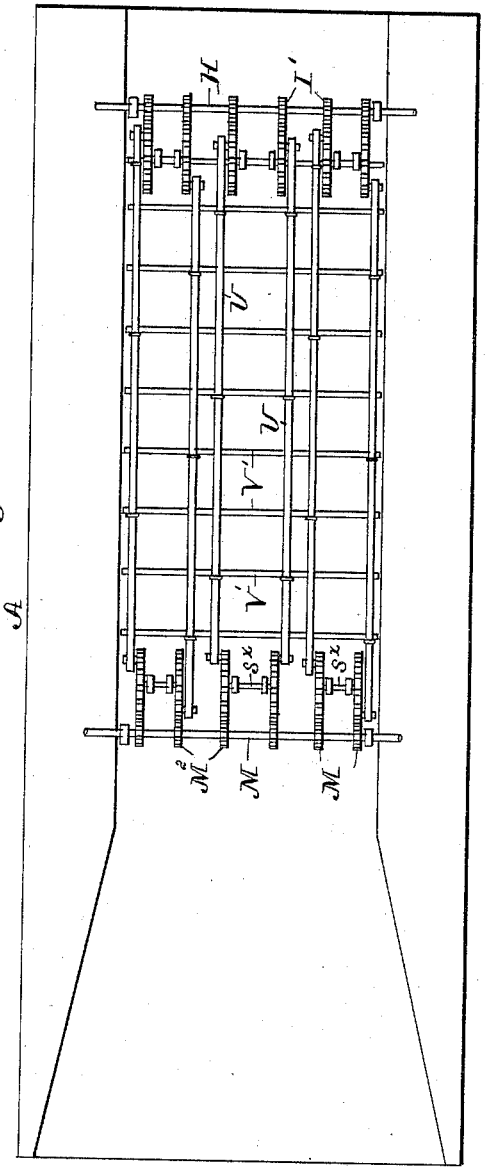
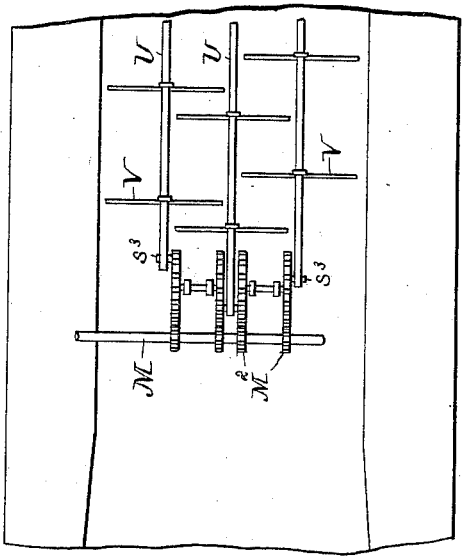
Witnesses:
F. G. Fischer
S. L. C. Hasson
Inventor
William H. Robinett
By Rich. H. Manning, Atty.

(No Model.)
W. H. ROBINETT.
HYDRAULIC MOTOR.
No. 476,174.   Patented May 31, 1892.
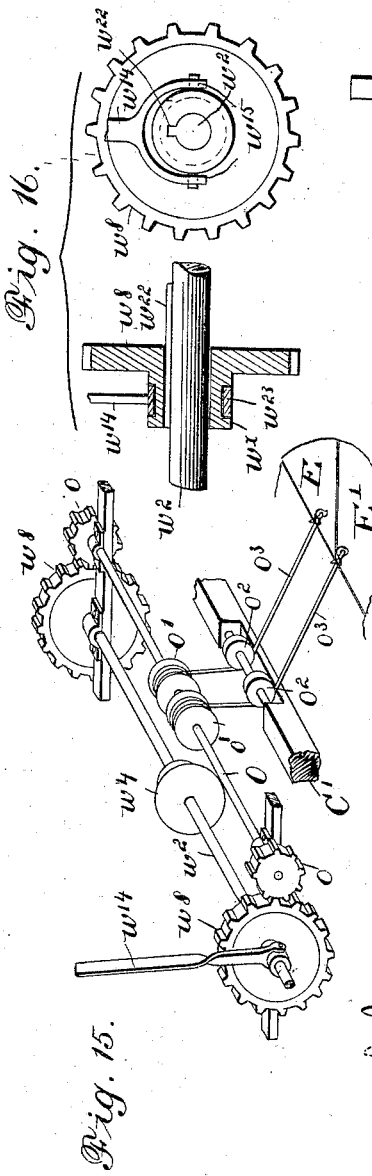
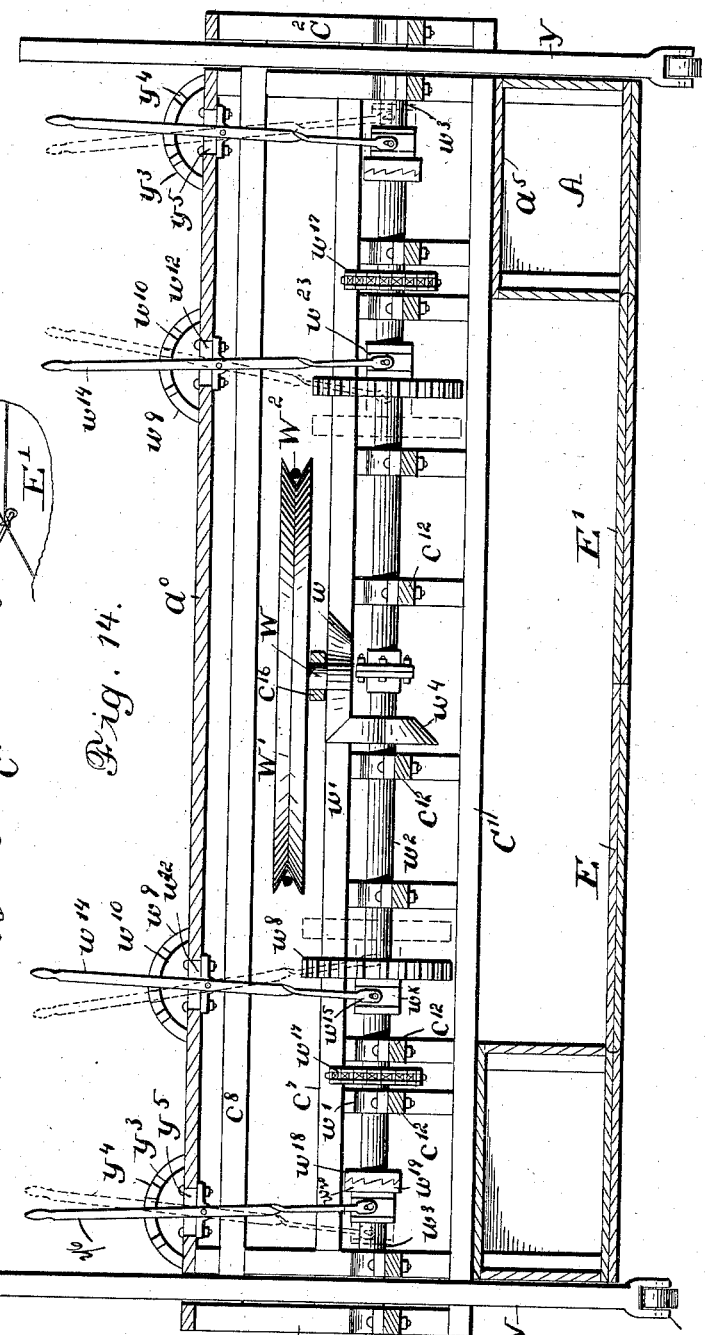
Witnesses:
F. G. Fischer
S. L. C. Hasson
Inventor
William H. Robinett.
By Rich'd H. Manning, Atty.

UNITED STATES PATENT OFFICE.

WILLIAM H. ROBINETT, OF KANSAS CITY, MISSOURI.

HYDRAULIC MOTOR.

SPECIFICATION forming part of Letters Patent No. 476,174, dated May 31, 1892.

Application filed January 12, 1891. Serial No. 377,476. (No model.)

*To all whom it may concern:*

Be it known that I, WILLIAM H. ROBINETT, a citizen of the United States, residing at Kansas City, in the county of Jackson and State of Missouri, have invented certain new and useful Improvements in Hydraulic Motors; and I do hereby declare that the following is a full, clear, and exact description of the same, which will enable others to make and use the same, reference being had to the accompanying drawings, forming a part of this specification.

The object of my invention is, first, to utilize the power of a stream of water in contact with a series of movable blades in the current and propelled thereby, one or more of which are alternately withdrawn from and submerged in the water in advance of the other and abreast of the current; second, to divert the current of water from the line of the blades and thereby arrest their movement; third, to elevate the series of blades above and adjust their position at alternate distances beneath the surface of the water; fourth, to increase the resistance of the blade-carrying rods to vertical strain when the current of water is acting upon the blades.

My invention consists in the novel construction and combination of parts, which will first be fully described, and specifically pointed out in the claims.

Figures 1, 2:
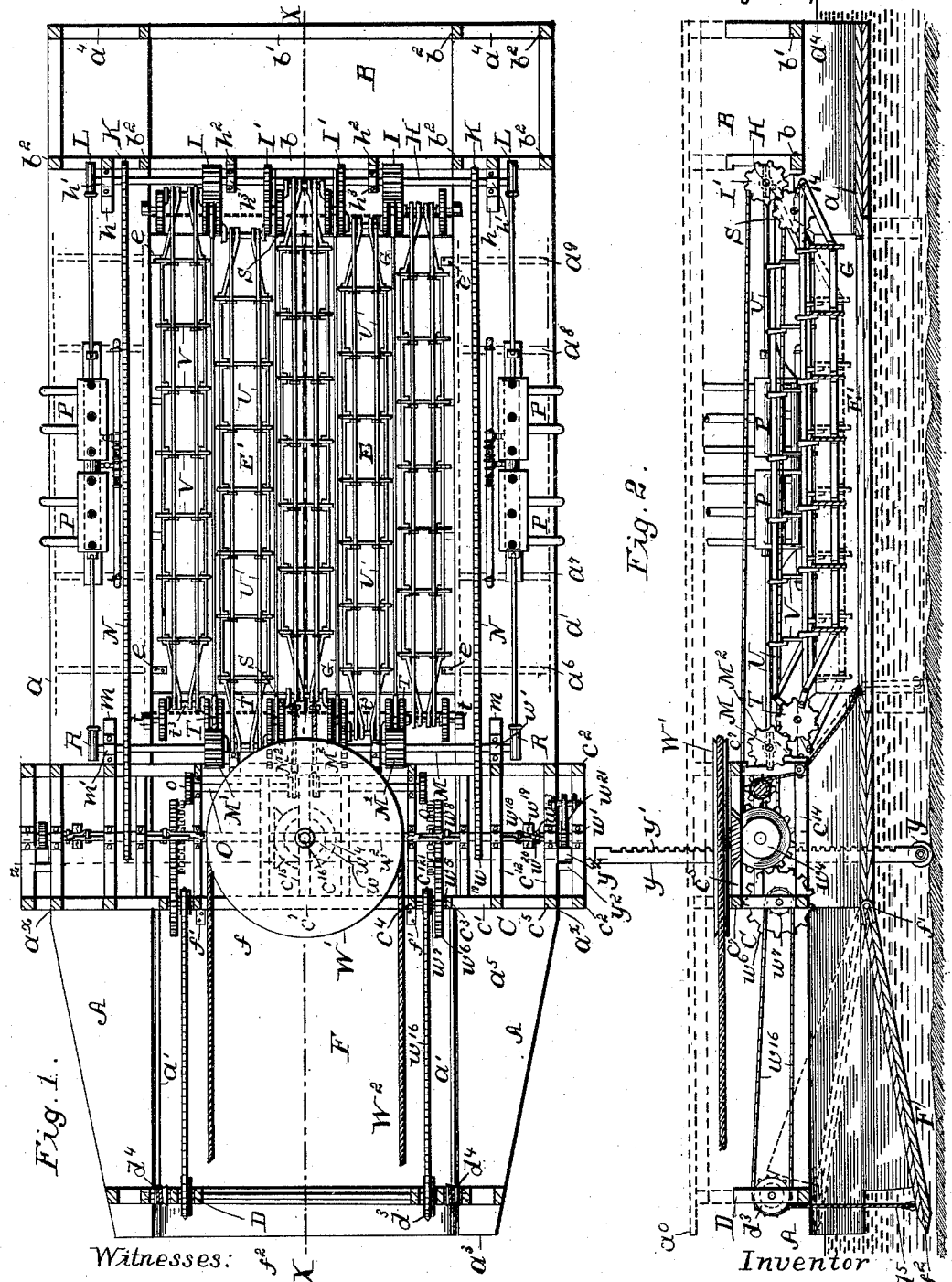
Figure 3:
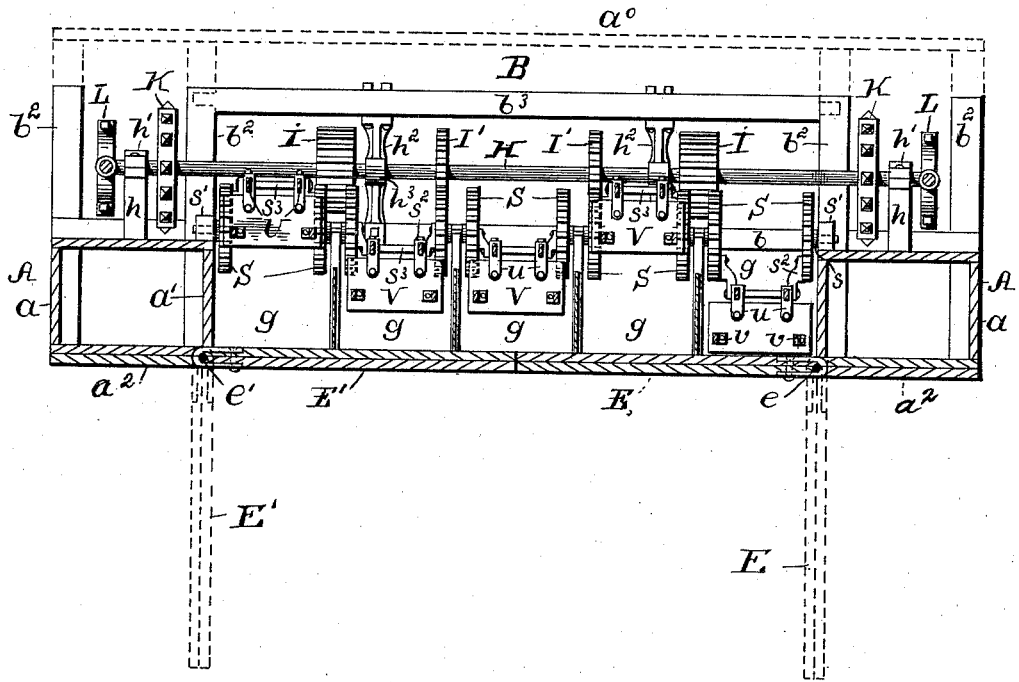
Figure 8:
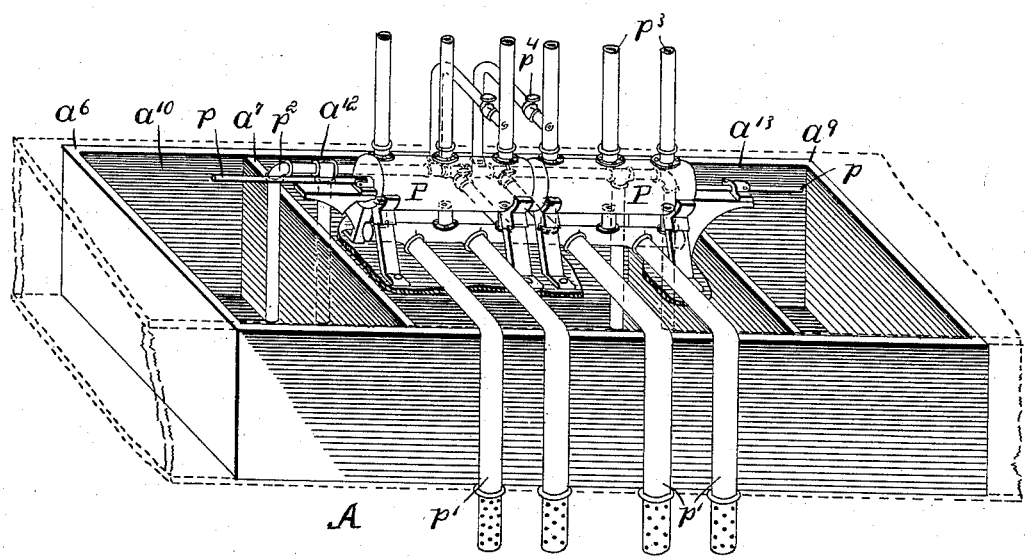

In the drawings, Figure 1 is a plan view of the barge with the top removed, showing the separate blades, the main drum and its driving-shaft, and the power-transmitting cable, the subdivided sluiceway and sluice-gate, the main driving-shaft, and the reciprocating blade-carrying rods and motor-blades thereon over the subdivided sluiceway, the water-chambers and supply-pumps connected with the driving-shafts. Fig. 2 is a longitudinal sectional view of the barge on the line $x\,x$ of Fig. 1. Fig. 3 is a cross-sectional view of the barge, taken between the driving-shafts, on the line $y\,y$ of Fig. 1. Fig. 4 is a detail view, upon an enlarged scale, in perspective of the front or gate end of the entire barge and separated from the rear end portion of the barge upon a transverse line drawn through the pumps on both sides of the barge. Fig. 5 is a broken longitudinal sectional view of the barge, showing the hinged end of the sluice-gate, the division-wall forming the separate sluiceways, the operating-gear, and the reciprocating rods and paddles in line with the sluiceways. Fig. 6 is a detail cross-sectional view of one of the floats of the barge, showing one of the driving-shafts carrying the sprocket-wheel and pump-operating eccentric, the sluiceway, a portion of the hinged bottom to the sluiceway, and the position of the paddles in adjacent sluiceways, and the driving-gears. Fig. 7 is a broken detail view in plan of an end portion of one of the transverse driving-shafts, showing a portion of one float and a sluiceway and its position, the blade-carrying reciprocating rod and power-transmitting gear in line with the sluiceway and the sprocket-wheel and chain and pump eccentric and rod on the driving-shaft. Fig. 8 is a detail view in perspective of a portion of one of the floats with the top portion removed, showing the separate water-chambers, the pump, and alternate suction and discharge connecting-pipes extending into the chambers, and also the suction-pipes extending over the side of the float. Fig. 9 is an alternate form of construction of the sluice of the barge to that shown in Figs. 1 and 4, showing the paddles on the reciprocating rods increased in length. Fig. 10 is a modified form of the arrangement of the paddles on the traveling rods to that seen in Fig. 9. Fig. 11 is an alternate view in detail of the means for connecting the ends of the reciprocating rods with the driving-gear; Fig. 12, front and side views, respectively, of the hangers for the paddles. Fig. 13 is a view in detail of the adjustable portion of the brace-bars of the paddles. Fig. 14 is a vertical sectional view of the forward end of the barge, taken upon the line $z\,z$ on Fig. 1. Fig. 15 is a detail view showing portions of the hinged bottom of the barge, the main driving-shaft, and sliding gear upon the forward end of the barge, the shafts carrying the rope winding and guide pulleys, and the elevating-ropes connected with the bottom portions of the barge. Fig. 16 is a detail vertical sectional view of one of the sliding gear.

Similar letters of reference indicate corresponding parts in all the figures.

In carrying out the details of my invention I construct a water-carriage or barge consisting of parallel water-floats A A, of a suitable length and buoyancy, which are placed in the water the proper distance apart to receive between them the motor, hereinafter described. Each float A is made with longitudinal sides $a\ a'$, bottom $a^2$, which is preferably of two thicknesses, and end portions $a^3\ a^4$. The said floats A A are comparatively narrow in width, the inner side portions of which are in straight lines nearly one-third of the distance from one or the forward end of each float, which meets the current in the direction of the other end. The outer sides $a\ a$ of each float are bent or deflected at angles at $a^\times$ and bent toward the side $a'$. Over each one of said floats is a top portion $a^5$, which conforms in width to the floats A A and the narrow portion in the direction of the end $a^3$.

Between the end portion $a^4$ of each float and the point $a^\times$, from which the side $a$ is inclined toward the end portion $a^3$, the interior of the float is divided by means of the transverse partitions $a^6\ a^7\ a^8\ a^9$ into separate compartments $a^{10}\ a^{12}\ a^{13}$. Two of said partitions $a^6\ a^7$ are placed a short distance apart in the transverse direction of the float and the other two $a^8\ a^9$ placed a corresponding distance apart in the same direction of the float toward the other end, thus forming an intermediate chamber $a^{12}$ between the partitions $a^7\ a^8$ of an increased length.

The floats A A are retained a fixed distance apart by a frame-work B at the extreme rear end portion of the barge near the ends $a^4\ a^4$ of the floats and a frame-work C at a point $a^\times$, near which the lines of the sides $a\ a$ of the floats are deflected toward the respective sides $a'$. The frame B is designed to support, also, one of the main driving-shafts connected with the motor, and it consists, first, of parallel beams $b\ b'$, which are arranged a short distance apart and extend in a transverse direction from one float A to the other float and to a point on each float in line with the vertical sides $a\ a$ and are secured to the top portion $a^5$ of each float. At the ends of the parallel beams $b\ b'$ and at proper distances apart in the line of said beams and in line with the sides $a\ a'$ of the floats A A are secured the lower end portions of the short vertical standards $b^2\ b^2$. Vertically in line with the beam $b$ is a supporting-beam $b^3$, which is attached in a horizontal position to the standard $b^2$ on one float and to the standard $b^2$ on the other at the respective end portions and a short distance between the upper end portions of said standards.

In the direction of the ends $a^3\ a^3$ of the floats A A or forward end of the barge are the parallel beams $c\ c'$, which are arranged a short distance apart and which extend in a transverse direction from one float A to the other and a short and equal distance beyond the line of the vertical sides $a\ a$ of the respective floats A A. The beam $c'$ is placed in position in advance of beam $c$, toward the ends $a^3\ a^3$ of the floats, the line of the beam $c'$ being extended from the angle described at $a^\times$ from the sides of the floats, as heretofore described.

To the extreme ends of the beams $c\ c'$ are attached the lower end portions of the corner standards $c^2\ c^2$, which are of the comparative height of the standards $b^2$ in frame B.

Secured to the beam $c'$ at the lower end, at a point nearly on line with the respective vertical sides $a'$ of each float A, are the gear-supporting standards $c^3\ c^3$, and a short distance from each one of said standards, in the direction of the other, are similar gear-supporting standards $c^4\ c^4$, and between the standards $c^3\ c^3$, in line with both beams $c\ c'$, and also with both the respective vertical outer sides $a\ a'$ of the floats, are the standards $c^5\ c^5$, which standards $c^2\ c^3\ c^4\ c^5$ correspond in height to that of the standards $b^2$ in frame B.

A short distance below the upper ends of the respective standards $c^2\ c^3\ c^4$, extending in the corresponding line of direction from the beams $c'$ and secured to the contiguous sides of said standards in divisional portions, is a tie-beam $c^6$, and above the beam $c$ is a similarly-arranged beam $c^7$. Vertically above the tie-beams $c^6\ c^7$ and extending from one corner standard $c^2$ on one float to the other standard $c^2$ on the other float are the roof-supporting beams $c^8\ c^8$.

Extending in a transverse direction to and at each end of the frame C and secured to the repective upper ends of the standards $c^2\ c^2\ c^5\ c^5$ are the parallel spar-guides $c^9\ c^{10}$.

In advance of the frame C and near the end portions $a^3\ a^3$ of the floats A and extending in a transverse direction from one top portion $a^5$ of float A to the top portion of the other float is rigidly attached in a vertical position a rectangular-shaped frame D, which corresponds in height to that of the respective frames B and C.

Constituting a part of the frame D are the vertical standards $d\ d'$, one of which $d$ is placed nearly in line with the vertical side portion $a'$ of each float and the other $d'$ a short distance therefrom in the direction of the other float.

In the standards $d\ d'$ is journaled a transverse shaft $d^2$, upon which shaft is rigidly attached a sprocket-wheel $d^3$ and close in position thereto a pulley $d^4$, for the purpose hereinafter described.

Extending over the barge and conforming thereto in length and width and resting upon the frames B C D is attached a flat portion $a^\circ$, as seen in dotted lines in Figs. 2, 3, and 4.

In a vertical line with the frame B, slightly increased in width and extending from one float A to the other in line with the bottom portion $a^2$ of each float, is a stationary bottom portion $a^{14}$ of the barge. In a vertical line with the frame C and also extending from one float A to the other in line with the bottom portion $a^2$ is a similar stationary bottom portion $a^{15}$, which is also of a comparatively increased width to that of the said frame C.

Between the stationary portions $a^{14}\ a^{15}$ of the barge the bottom portion of the sluiceway between the respective barges A A is separated in the longitudinal direction of the floats A A and at a point equidistant from each one of the said floats in two separate portions E E', which portions are hinged at $e\ e$ in line with and to the bottom portions $a^2$ of the respective floats A A and are opened and closed in the manner and for the purpose hereinafter described. In the direction of the end portions $a^3\ a^3$ of said floats and hinged at $f\ f'$ at one end F to the stationary bottom $a^{15}$ is the sluice-gate, which extends laterally a distance nearly equal to that from the inner side $a'$ of one float to the inner side portion $a'$ of the other float and to the other end $f^2$ extends in the longitudinal direction of the floats A to a point in line with said end portion $a^3$ of the said floats, which end vibrates in an upward direction.

To the longitudinal sides of the sluice-gate F and closing the space between the said sides and the sides $a'$ of the floats A are rigidly attached the wash-boards $f^2\ f^3$, which are of the proper width to enable the depression of the vibrating end of the sluice-gate to be made, and which boards taper in width in the direction of the other end toward the stationary bottom portion $a^{15}$ of the barge.

To the vibrating end portion $f^2$ of the sluice-gate F is attached one end of a rope $d^5$, the other end of which is wound around and attached to the pulley $d^4$ in the frame D. The open space between the sides $a'$ of each float A above the stationary bottom portions $a^{14}\ a^{15}$ and the hinged bottom E E' of the barge is then separated by means of the longitudinal partitions G, which extend from a point in line vertically with the beam $c'$ of frame C to the extreme end of the barge in the direction of the frame B and are placed an equal distance apart in the transverse direction of the barge, so as to form intermediately a series of channels $g\ g$. The partitions G are each made in sections, one portion of which extends from the line of the beam $c'$ a short distance past the vertical line of the beam $c$ of the frame C in one comparatively thick separate piece and in a vertical direction to a point nearly on line with the upper side portion of the beam $c$, on the side of said beam toward the frame B, and the other end portion $g^2$ of the partition G beneath the frame B is made in a similar manner to $g'$.

To the respective end portions of each of the sections $g'\ g^2$ of the partition G, which extend toward each other, is bolted a thin longitudinal sluice-dividing plate $g^3$. (See Fig. 5.)

Upon the side of frame B, in the direction of the frame C, and mounted on each float A equidistant from the lines of the sides $a\ a'$ near the beams $b$ are short vertical standards $h\ h$, upon the upper ends of which are the journal-boxes $h'\ h'$.

To the beams $b\ b$ are bolted at their respective upper and lower ends the vertical shaft-hangers $h^2\ h^2$, which are arranged above the sluiceways $g\ g$, and the journal-bearings $h^3\ h^3$ thereon are placed in line with the journal-boxes $h'\ h'$ on the standards $h\ h$. In the said journal-bearings $h'\ h^3$ is mounted one of the main driving-shafts H.

Upon the shaft H, on the sides of each bracket $h^2$ toward the standards $h\ h$, and arranged in position in line vertically with the respective partitions G which are contiguous with the inner side $a'$ of the floats A A are mounted the gear I I, the teeth of each gear being made comparatively wide. Upon said shaft H, between the brackets $h^2\ h^2$, are mounted the gear I' I', the teeth of which are made narrow or one-half of the width of the gear I and arranged in position upon one side of the contiguous partition G.

Upon both ends of shaft H, upon one side of standard $h$ which is facing toward the respective gear I, are mounted close in position to said standard $h$ the sprocket-wheels K K, and upon the extreme end of the shaft, on the other side of standards $h\ h$, are mounted the crank-eccentrics L L, for the purpose hereinafter described.

Upon the side of frame C in the direction of the frame B and upon the top $a^5$ of floats A A, close in position to the beam $c$, are mounted short standards $m\ m$, which correspond in height and which are oppositely in position to standards $h\ h$, which support shaft H, and are surmounted by the journal-boxes $m'\ m'$.

To the respective beams $c\ c^7$ in frame C are attached the vertical brackets $m^2\ m^2$, which are arranged oppositely in position to the brackets $h^2$ on the frame B, and upon said brackets $m^2$ are the journal bearings or boxes $h^3$, (see Figs. 3 and 6,) which are arranged transversely in line with the journal-boxes $m'$ on the standards $m\ m$. In the journal-boxes $m'\ m^3$ is mounted the driving-shaft M.

Upon the shaft M, directly opposite in position to the gear I on shaft H, is mounted the wide peripheral gear M' M', and directly opposite the said gear I' I' is mounted the gear M² M², which is similar to gear I'. Upon the extreme end portion of the shaft M, opposite in position to the eccentrics L L, are mounted similar eccentrics R R.

Below the line of shaft H, upon the horizontal edge of each portion $g^2$ of the partition G, and also on the top portion $a^5$ of each float A and in line with each other are placed the journal-boxes $s'\ s'\ s'$, in which are journaled on short journals $s\ s$, close in position to and on both sides of each portion $g$ of said partition and also close in position to the side portion $a'$ of the floats A, the series of gears S, which gears S S on both sides of a single partition G are made to mesh with the single wide gear I, vertically in line with the said partition, and the other single gear on one side of a partition with the gear I' on said shaft H.

In the direction of the frame C and below the line of the shaft M, on the upper horizontal edge of the portion $g'$ of the partition G and also upon the top portion $a^5$ of the floats A, in line with each other, are mounted the journal-boxes $t\ t$, in which are journaled the series of gears T, which are directly opposite in position to the gears S and are similarly constructed and made to mesh in pairs with the gears $M'\ M^2$ on the shaft M.

To the side of each one of the series of gears S other than that contiguous to the side of the floats on the partition G, near the peripheral portion, is rigidly attached one end of a crank-arm $s^2$, the other end of which extends a short distance beyond and radially to the periphery of said gear S and is arranged in position in respect to the series of gears S as follows: The arms $s^2$ on the side of the gear S, directly opposite to each other in the channel $g$ of the sluiceway contiguous to one float A, are arranged in the line of the diameter of their journals $s$ in one corresponding line of direction. In the next channel of the sluiceway $g$ the arms $s^2$ on the gear in said adjoining sluiceway are also arranged in one corresponding line of direction and are both pitched one degree, proportionate to the number of sluiceways on the barge and in the line of the circumference of said gear, at an angle to the arms in the other channel $g$ of the sluiceway, and in the successive channels of said sluiceways in the direction of the other float of the barge the angle of the arms in said channels are made to describe a different angle from the ones in the preceding channels of said sluiceways.

In each channel of the sluiceway and rigidly connecting the respective end portions of the arms $s^2\ s^2$ other than that attached to the gear S is a crank $s^3$.

To the gears T are connected in the same manner as that of the arms $s^2$ the arms $t^2$, which arms are arranged upon the gear T in the same channel of the sluiceway at the same pitch in the line of the circumference of the said gear as those directly opposite on the gears S and the said arms $t^2$ rigidly connected by the cranks $t^3$ in the same manner as heretofore described upon gear S.

Pivotally connected with one of the cranks $s^3$, close in position to the respective arms $s^2$ in each channel of the sluiceway, are the parallel traversing rods U U, the other ends of which extend in the line of direction of said channel to and are pivotally connected with the cranks $t^3$ on the gear T, which are directly opposite in position in the same channel and whose arm describes the same angle in respect to that of the other gears.

To each one of rods U U are attached the upper end portions of a series of hangers $u\ u$, each one of which is perforated transversely at $u'$ (see Figs. 3 and 6) to receive said rod U and also provided with an intersecting screw-threaded perforation $u^2$ to receive an adjusting-screw $u^3$.

In a transverse direction to the rods U U, in the line of each channel $g$, is arranged a series of paddles V, which severally consist of a vertical flat plate nearly equal in width to that of said channel, the upper end portion of which is rigidly attached to the lower end of two of the series of hangers $u\ u$ in a transverse position on both rods U U, and the lower end of each paddle is made to extend nearly to the horizontal bottom portions E E' of the barge when placed at the lowest point within the said channel of the sluiceway.

To the side portion of the paddles V in each channel $g$, in the direction of the respective cranks $s^3\ t^3$, near the lower edge portion, is attached one end portion of the flat bars $v\ v$, in the other ends of which are longitudinal slots $v'$.

To the cranks $s^3\ t^3$ are pivotally attached one end of the flat brace-bars $v^2\ v^2$, in the other ends of which are the longitudinal slots $v^3\ v^3$. The slotted end portions of the said bars $v'\ v^3$ are brought together, through which are inserted the threaded bolts $v^4$, which are provided with the adjustable nuts $v^5$. To the opposite sides of contiguous paddles V V in the series of paddles on rods U U are also secured in the same manner similar adjustable brace-rods $v\ v^2$, which, however, are arranged in a horizontal position, so that a continuous truss-brace is afforded to the paddles V the length of the traversing rods U U.

In the frame C on the barge, extending in a transverse direction from the standards $c^2$ $c^3\ c^4\ c^5$ on one side of the frame to the corresponding standards on the other, is a series of supports $c^{12}$, which are of the same height in respect to each other and also slightly higher in position than the standards $m\ m$, which support the shaft M.

Equidistant from both ends of the respective beams $c\ c'$ of frame C and attached to the parallel beams $c^7\ c^7$ is a beam $c^{15}$, through which is made a vertical shaft-opening $c^{16}$. (See Fig. 14.)

Upon the upper end of shaft W, which extends through the bearing $c^{16}$ on the beam $c^{15}$, is rigidly attached a grooved wheel or drum W'. Around drum W' is placed an endless power-transmitting cable $W^2$.

Upon the shaft W, beneath the beam $c^{15}$, is attached a bevel-gear $w$.

Upon the support $c^{12}$, at points equidistant from the opposite side standards $c^2\ c^2\ c^5\ c^5$, are secured in line with each other the series of journal-boxes $w'$, and in which boxes are mounted the sectional shafts $w^2\ w^3$. The single shaft $w^2$, which receives the power from the water-actuated paddles and transmits the same to the drum W', extends in opposite directions to a point between the shaft-supports $c^{12}\ c^{12}$ above the respective floats A.

Upon shaft $w^2$, near shaft W, is rigidly attached a bevel-gear $w^4$, which gear is made to mesh with the gear $w$ on said shaft W.

To the gear-supporting standards $c^3\ c^4$ in frame C a corresponding height to the shaft $w^2$ is journaled the transverse shaft $w^5$, upon which is attached rigidly the gear $w^6$, and in close position to said gear the sprocket-wheel $w^7$.

On the shaft $w^2$, in line with the gear $w^6$ on the shaft $w^5$, is rigidly connected the sliding gear $w^8$, which is made to engage with and be disengaged from gear $w^6$.

Upon the top of the float $a°$, vertically in line with the shaft $w^2$ and over gear $w^8$, is attached a sector $w^9$, in which are radial notches $w^{10}$, and through the said top $a°$ is made in line with the face of said sector a perforation $w^{12}$. To the said top portion $a°$ of the barge, in the slot $w^{12}$, is pivotally attached a lever $w^{14}$, one end of which extends a short distance above the said top portion of the float and in contact with the notched sector $w^9$. The other end portion of the lever $w^{14}$ is forked at $w^{15}$. The sliding gear $w^8$ is secured to the shaft $w^2$ by a feather or key $w^{22}$.

Upon the side of gear $w^8$ is a grooved flange $w^x$, concentric to shaft $w^2$, within which grooved flange is fitted loosely a sleeve $w^{23}$. To the sleeve $w^{23}$ is pivoted the forked end $w^{15}$ of the lever $w^{14}$. Two of said sliding gears are provided upon the barge and placed in a corresponding position upon the shaft $w^2$ and the same distance from shaft W.

Over the sprocket-wheel $w^7$ on the shaft $w^5$, between standards $c^3$ $c^4$, is passed one end of a sprocket-chain $w^{16}$, and the other end is passed over the sprocket-wheel $d^3$ in the frame D and the two ends connected together in the usual manner. Upon the shaft $w^2$ is also rigidly attached a sprocket-wheel $w^{17}$, which is placed in position directly opposite the sprocket-wheel K on the shaft H near the frame B on the barge, and over said sprocket-wheel $w^{17}$ is placed one end of the sprocket-chain R, the other end of which chain is passed over the said sprocket-wheel K on the said shaft H and the two ends connected together in the usual manner.

On the end of shaft $w^2$ above the float $a$ is rigidly attached one portion $w^{18}$ of a toothed clutch $w^{19}$. The shaft $w^3$ is short in length and extends in line with the shaft $w^2$ and outwardly as far as the standards $c^2$ of the frame C.

Upon the inner end of the shaft $w^3$ is attached the other toothed portion $w^{20}$ of the clutch $w^{19}$, which is secured to and slides on said shaft $w^3$ in precisely the same manner as shown by the sliding gear $w^8$ (see Fig. 16) and engages with the portion $w^{18}$ of said clutch. Within the same frame C and above the other float A is arranged a similar shaft $w^3$, which is thrown in and out of engagement with the shaft $w^2$ in like manner.

Upon the shaft $w^3$, between the supports $c^{12}$ in the respective standards $c^2$ $c^5$, is attached rigidly the pinion $w^{21}$. On said supports $c^{12}$ $c^{12}$ is also pivoted a pawl $w^{24}$, which engages with the pinion $w^{21}$.

Between the transverse bars $c^9$ $c^{10}$ on the frame C and extending also in line with the side $a$ of the float A is placed in a vertical position a spar Y, the lower end of which extends to the bed of the river and is forked and provided with a roller $y$ on the side of the spar, which is made to engage with the pinion $w^{21}$ on the shaft $w^3$. On the other side of the spar and rigidly attached in a vertical position to the said strips $c^9$ $c^{10}$ $c^{12}$ is a guide-bar $y^2$.

Upon the top portion of the float $a°$, in a vertical line with the shaft $w^2$ and above the clutch $w^{19}$, is attached a sector $y^3$, which is notched at $y^4$, and through the said top portion $a°$ of the barge is made in line with the notched face of the sector a perforation $y^5$.

To the top portion $a°$ of the barge, in the slit $y^5$, is pivotally attached a lever $y^6$, one end of which extends upwardly and engages with notches $y^4$ in the sector $y^3$. The other end portion of the lever $y^6$ is forked at $y^7$ and engages with a circular grooved flange $y^x$ on the side of the portion $w^{20}$ of the clutch $w^{19}$.

Upon the other float A and in the other end portion of frame C the mechanism heretofore described on shafts $w^2$ $w^3$ is precisely the same, extending from one float A to the other, and journaled on the supports $w^{12}$ $w^{12}$ in frame C parallel with the shaft $w^2$ and near the brackets $m^2$, which support the main shaft M, is a shaft O, to each end of which is attached a gear $o$, which is placed in position nearly in line with the sprocket-wheel $w^7$ on the shaft $w^2$, carrying the gear $w^6$, and so as to engage with the sliding gear $w^8$.

On the shaft O, at a point equidistant from the two gears $o$ $o$, are rigidly attached two pulleys $o'$ $o'$. On the beam $c$, beneath said pulleys $o'$, are the guide-pulleys $o^2$. To one pulley $o'$ is attached one end of a rope $o^3$, which is wound round said pulley $o'$ and the other end extended in a downward direction over the guide-pulley $o^2$ and attached to the portion E of the hinged bottom of the barge, and to the other pulley is attached a similar rope $o^3$, which is wound around the companion pulley and the other end extended in a downward direction over a guide-pulley $o^2$ and attached to the other portion E of the said bottom of the barge.

Upon float A and secured to the top portion $a^5$ over the chambers $a^{10}$ $a^{12}$ $a^{13}$ are the suction and force pumps P P, which are placed in line, and from each pump extend in opposite directions the piston-rods $p$ $p$, one of which is connected with the eccentric R on shaft M in one direction and the other piston-rod $p$ connected with the eccentric L on shaft H in the other direction.

To the pumps P P are connected on one side the main suction-pipes $p'$, which extend over the sides of the float into the water, and on the other side of each pump are the alternate suction and discharge pipes $p^2$, which extend into the said chambers $a^{10}$ $a^{12}$ $a^{13}$. From the pumps P also extend the vertical discharge-pipes $p^3$, which are made to discharge in any direction preferred. On the pipes $p^3$ are valves $p^4$ for regulating the suction and discharge pipes. On the other float A are similar pumps P, which are similarly constructed and arranged and the pipes made to enter the chambers in a similar manner.

In Fig. 9 I have shown a barge without the channels in the sluiceway, and in this construction I aim to control as much of the power of the water as is possible in one direction by increasing the length of the paddles, and in so doing the several paddles in a series on the parallel rods U U are extended the full length in the transverse direction of the floats A A. Instead of the arrangement of the paddles, as in Fig. 1 single connecting-rods $u$ are attached at each end to the crank-wrist of a gear upon its outer side. Two of such gears are mounted upon and rotate independent of each other upon short lengths of shafts $s\ s$. When the said gears are placed in position, so as to mesh with the gears upon the respective shafts H and M, the rods carrying the paddles are so connected with the respective crank-wrists that both ends of the separate rods move up and down at the same time.

To enable the paddles in movement to pass one over the other, the paddles are arranged upon single connecting-rods, as seen in Fig. 10, either a short distance in advance or in rear of the next contiguous series of paddles, and in the described circle of rotation of the cranks $s^3$ the said paddles V whose length is governed by the position of the cranks on adjunct gears describe a circle of rotation over and under each other.

In Fig. 11 I have shown in place of connecting the rods U directly with the crank-wrist, as in Fig. 1, an eccentric $U^2$ connected with the rod and the crank-wrist, so that the paddles in entering and leaving the water are given an accelerated movement.

In the operation of the mechanism heretofore described for the transmission of power received from the water-currents the barge, consisting of the floats A A, as described, is anchored in position with the ends $a^3\ a^3$ of the floats abreast of the current in the river or in the line of the water-flow. The vibrating end portion $f^2$ of the sluice-gate F is then lowered in position below the line of the stationary bottom portion $a^{15}$ of the floats and the current of the water controlled by the sides $f^3$, which prevents the escape of the water through the sides, is admitted to the channels $g\ g$ of the sluiceway and the volume of water which meets the series of blades or paddles V carries said paddles which are in the bottom of the several sluiceways and in the path of and abreast of the current with great force the distance described in the circle of rotation by each crank $s^3\ t^3$ rearwardly in the direction of the frame B in the floats A A, and in this movement the paddles upon other traversing rods are moved in the direction of the sluice-gate F, and in the rotation of the respective gears S T are lowered into and are met by the current and carried in the direction of the frame B in the rear end of the barge, and in this manner rotation is imparted to said gears S T, thence to the driving-shafts H M, and from shaft H through the sprocket-chains N N to the shaft $W^2$, through gears $w^4\ w$ to the shaft W, the drum W', and the endless traveling cable $W^3$, from which the power is conveyed to other mechanism which is upon the shore or in the river, as the application of such power is demanded.

To control the supply of water to the motor, and thus increase or diminish the rapidity of operation of the paddles V, the lever $w^{14}$ is operated to throw the gear $w^8$ on shaft $w^2$ in mesh with the gear $w^6$, and through the sprocket-chain $w^{16}$ and sprocket-wheel $d^3$ the pulley $d^4$ is operated, which operates the rope $d^5$, connected with the gate F, and the sluice-gate is raised the proper height, and if it be necessary to stop the motion of the paddles the vibrating end $f^2$ of the gate F is raised above the level of the water-line to a position near the top $a^5$ of the floats A. (Seen in dotted lines, Fig. 2.) The buoyancy of the floats is sufficient to retain the lower end portions of the paddles in the water submerged a uniform depth or sufficient to take the surface upper current whenever the power thus derived is sufficient in quantity. When, however, this current is insufficient in power, the valves on the discharge-pipes $p^4\ p^4$ of the pumps P are opened to admit the water into the respective chambers $a^{10}\ a^{12}\ a^{13}$ in each float A, and as the water so admitted fills the chambers the floats sink the proper depth in the stream and the paddles are brought within the under-current, and should the depth of the paddles be greater than necessary the valves $p^4$ are closed and the amount of water drawn out of chambers $a^{10}\ a^{12}\ a^{13}$ to raise the floats and the paddles the proper distance in the line of the under-current, and in this manner the submerging of the paddles in the water is adjustably maintained.

To keep the barge level at all times, either chamber may be filled or emptied, as the position of the ends of the barge vary from the horizontal.

To prevent the flow of the water over the sluice-gate F from submerging the ends $a^3$ of the floats at other times and also for the purpose of anchoring the barge in the stream temporarily, the lever $y^6$ is operated to throw the clutch $w^{19}$ on shaft $w^3$ into engagement, and the pinion $w^{21}$ in its direction of rotation with said shaft carries the spar Y in a downward direction, the roller $y$ on the end of said spar guiding its descent past obstructions in the bed of the river. The pawl $w^{24}$ engages with the pinion $w^{21}$ in an opposite direction to that of its rotation, and in this manner the mast Y, which may be lowered after the raising of the sluice-gate F, will be enabled to preserve the position of said end of the barge.

The hinged bottom portions E E' of the barge are made for the purpose of quickly removing any obstruction which may float in the channels of the sluiceway by lowering the gate and allowing the obstruction to fall through and escape.

In narrow rivers and small water-courses the floats A A may serve to dam the water and the inclination be given to the inner sides $a'$ $a'$ of the floats.

In sluiceways for mills the mechanism heretofore described is placed above and with the paddles in the mill-race. The gate F then act to dam the water until the proper time to operate the paddles.

Having fully described my invention, what I now claim as new, and desire to secure by Letters Patent, is—

1. In hydraulic motors, a water-carriage having side supporting-floats and an intermediate sluice, transverse gear-supporting beams at both ends of said carriage, having individual gear-supports at an angle to said beams above said sluice, transverse main driving-shafts journaled upon said floats upon the opposing sides of said beams, having gear thereon, parallel traversing rods in the line of direction of said sluice, having cranks at both ends, and gear connected with said cranks, mounted on said gear-supports, and meshing with said driving-shafts, substantially as and for the purpose described.

2. In hydraulic motors, a carriage having floats on both sides and an intermediate sluice having channels and channel-partitions in the line of direction of said sluice, transverse gear-supporting frames at both ends of said carriage, transverse main driving-shafts journaled upon said floats on the opposing sides of said gear-supporting frames, parallel traversing rods in the line of direction of said sluice, having water-actuated paddles, meshing gear on said driving-shafts and said channel-partitions, and cranks on both ends of said traversing rods connected with the gear on said channel-partitions, substantially as and for the purpose described.

3. In hydraulic motors, a water-carriage having side floats and an intermediate sluice, a hinged bottom to said sluice, transverse gear-supporting frames at both ends of said floats and main driving-shafts on the opposing sides of said frames, suitable water-actuated paddles in said sluice having paddle-supporting shafts in gear with said main driving-shafts, separate power-distributing shafts in one of said gear-supporting frames having gear connected with the main driving-shafts, winding-ropes connected with one of said power-distributing shafts at one end and also connected with the hinged bottom at the other, and shafting-gear on said separate power-distributing shafts connected with each other, for the purpose described.

WILLIAM H. ROBINETT.

Witnesses:
S. L. C. HASSON,
GEORGE A. MASTERS.